United States Patent [19]

Garabedian

[11] Patent Number: 4,761,261
[45] Date of Patent: Aug. 2, 1988

[54] NUCLEAR REACTOR

[75] Inventor: George Garabedian, Boston, Mass.

[73] Assignee: Stone & Webster Engineering Corp., Boston, Mass.

[21] Appl. No.: 582,096

[22] Filed: Feb. 21, 1984

[51] Int. Cl.⁴ .............................................. G21C 15/00
[52] U.S. Cl. .................................... 376/404; 376/285; 376/286; 376/290
[58] Field of Search ............... 376/171, 179, 285, 286, 376/290, 402, 403, 406

[56] References Cited
U.S. PATENT DOCUMENTS 3,196,047  7/1965  Toulmin, Jr. ........................ 376/402
3,395,076  7/1968  Ruppen, Jr. ......................... 376/285
3,716,451  2/1973  Van Sickel et al. ................. 376/285
3,901,196  8/1975  Dorner et al. ....................... 376/285
4,069,101  1/1978  Mangus ............................... 376/403

Primary Examiner—Donald P. Walsh
Assistant Examiner—Richard L. Klein
Attorney, Agent, or Firm—Hedman, Gibson, Costigan & Hoare

[57] ABSTRACT

A novel liquid nuclear reactor is described which comprises a reactor vessel that is connected through upper and lower liquid conduit means to one or more satellite tanks that contain a heat exchanger means and pump means.

15 Claims, 7 Drawing Sheets

NUCLEAR REACTOR

FIELD OF THE INVENTION

This invention is concerned with an improved liquid metal nuclear reactor for the production of steam. More particularly, this invention is directed to a liquid metal nuclear reactor comprised of a reactor core in a vessel that is connected to one or a plurality of discrete satellite tanks which house thermal hydraulic equipment such as pumps and heat exchangers.

BACKGROUND OF THE INVENTION

Nuclear reactors have required and have been provided with cooling means since the early days of nuclear reactor development. Various coolants have been tried.

In the past liquid metal nuclear reactors have been made which have been cooled with mercury, liquid sodium or a liquid sodium-potassium mixture.

There are two basic types of liquid metal reactors which have been under development for commercial nuclear power applications. These reactors have been described as loop reactors such as the Fast Flux Test Reactor and the Clinch River Breeder Reactor in the United States or the pool type reactor such as the Phenix in France. These reactors have used liquid metal sodium as the primary coolant.

In the loop reactor, the core, pumps and intermediate heat exchangers are located in separate vessels and connected with pipes. The sodium is pumped from the core to the heat exchanger and back to the core. There is no pool of liquid metal in this reactor as there is in a pool reactor.

The pool reactor comprises a large vessel or pot containing liquid sodium in which the reactor core, intermediate heat exchangers and the primary circulating pumps are located. In this configuration, the cool liquid sodium is pumped to the core from which it flows into a pool of hot sodium and then through the heat exchanger and is discharged into a pool of cool sodium, prior to entry to the pumps.

In the prior art, alternate designs of the loop reactors have been described wherein the intermediate heat exchanger and the pump have been housed in an auxilliary vessel which is connected to the main reactor vessel by a duct having a coaxial pipe.

The prior art loop reactors have required complex pipe arrangements including snubbers, hangers, heating systems, insulation, inspection capability means and usually a check valve and flow measuring device. The entire primary system is enclosed within an inert atmosphere and a steel lined concrete cell compartment. Guard vessels or some other means such as siphon breakers are provided to insure a safe minimum level of sodium within the reactor vessel in the event of a leak in the piping system.

The prior art pool reactors have been difficult to fabricate and have presented engineering difficulties due to the relatively confined area of the main reactor vessel which contains the reactor core, intermediate heat exchangers and pumps as well as reactor core shielding. The size of these vessels requires a complex fabrication and assembly process with the accompanying quality control problems. The relatively crowded interior of the pool reactor provides little design flexibility and may necessitate compromises in the design of the pump, heat exchanger and associated structures.

The amount of primary coolant embodied by the pool concept is usually larger than the loop plant thus providing an added margin for safety in the event all decay heat removal systems fail. For Superphenix I, a separate containment structure is provided for the atmosphere above the vessel head because safety authorities have postulated that conditions may occur which can cause the primary coolant to be ejected through the seals of the vessel head. A steel cover may be provided above the vessel to act as a containment barrier but such a cover is difficult to provide because of the large size of the head, the many penetrations required for completing the circuits of the secondary coolant and the need to remove, for maintenance and repair, the primary pump or the primary heat exchanger. The pool type of design does not require separate primary cells, a primary cell inerting and cooling system and primary piping hangers or snubbers. In addition the pool reactor due to the multiplicity of pumps hydraulically connected to a common pool has the advantage of not requiring fast acting check valves in the primary circuit and the operational flexibility of not requiring immediate trip of the pumps during a reactor shutdown.

SUMMARY OF THE INVENTION

This invention provides a liquid metal reactor wherein the primary pump and heat exchanger are in a separate satellite tank that is connected to the main reactor vessel with upper and lower conduit means that minimize the distance between the reactor vessel and the satellite tank. The size of the separate satellite tank is such that the satellite tank and the reactor provide a sufficiently large volume of liquid metal so that space is provided for a sufficient volume of liquid metal that is capable of dampening temperature transients resulting from abnormal operating conditions.

The advantages of this invention are that the reactor vessel may be made much smaller than in the pool arrangement and yet the system will have the advantage of having a very substantial thermal inertia due to the relatively large amount of available liquid metal. The satellite tank which contains the pump and heat exchanger may be fabricated as a module and multiple modules may be used in combination with a single reactor. The design provides a great deal of flexibility for advancements since the modules may include optimized pumps and heat exchangers that are designed without including the constraints that are dictated by the dimensions of a pool reactor.

It is therefore a primary object of the invention to provide a novel liquid metal reactor system that eliminates the piping problems inherent in the design of a loop type liquid metal reactor and the design, fabrication and construction difficulties associated with a pool type reactor vessel.

It is also an object of this invention to provide a liquid metal reactor that has a novel containment system.

It is a further object of this invention to provide a liquid metal reactor that inherently accommodates thermal expansion forces.

It is also an object of this invention to provide a liquid metal reactor that operates in a similar fashion as a pool plant, can utilize pool plant type of primary pumps and intermediate heat exchangers and has the advantages associated with small and less complex reactor vessels.

It is also an object of this invention to provide diverse, independent means of decay heat removal in a liquid metal reactor in which the decay heat removal systems are not susceptible to liquid metal slug formation due to a core disruptive accident.

The liquid metal reactor of the invention comprises a reactor vessel having a core, at least one satellite tank; pump means in said satellite tank; heat exchanger means in said satellite tank; an upper liquid metal conduit extending between said reactor vessel and said satellite tank; a lower liquid metal conduit extending between said reactor vessel and said satellite tank and said satellite tank having space for a volume of sodium that is sufficient to dampen temperature transients resulting from abnormal operating conditions.

BRIEF DESCRIPTION OF THE DRAWINGS

The objects and advantages of the invention will become more apparent from a review of the appended drawings and specification.

FIG. 6A is a partial cutaway view of the pump chamber of the pump in the satellite tank of FIG. 6.

DETAILED DESCRPITION OF THE PREFERRED EMBODIMENT OF THE INVENTION

Figure 1:
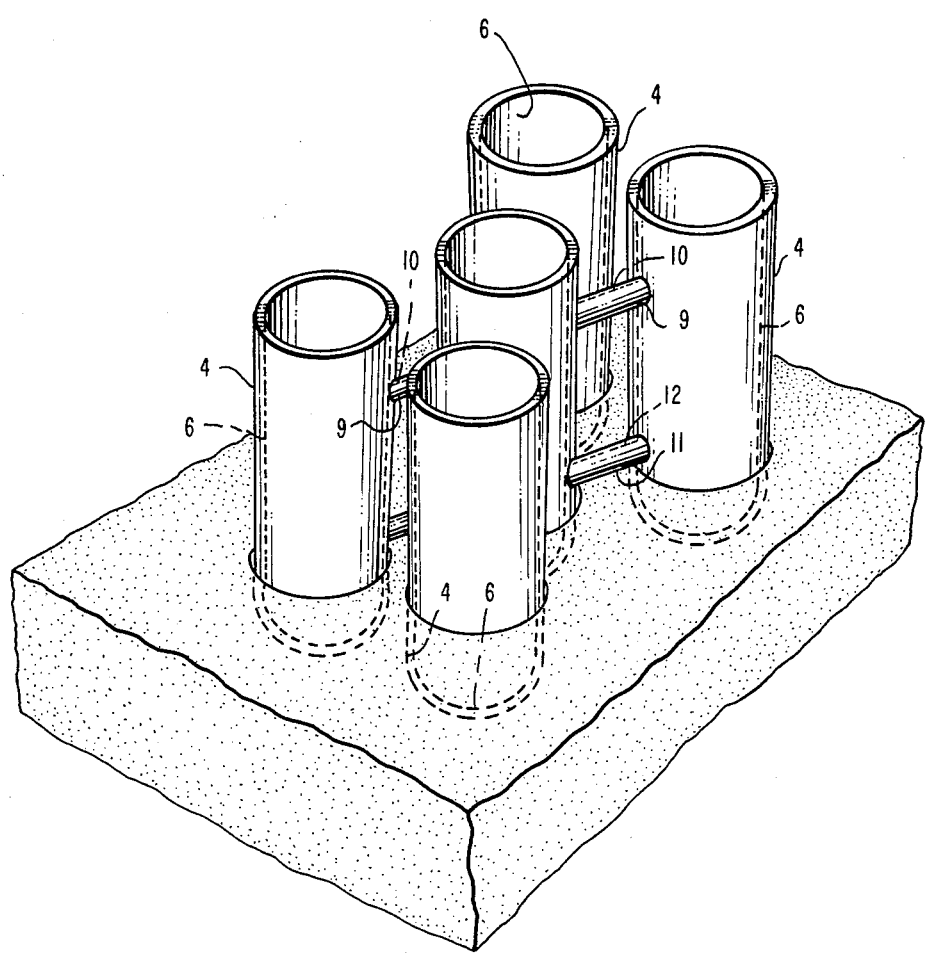
FIG. 1 is a perspective view of a liquid metal reactor of the invention which has four satellite tanks.

The present invention is based on a single reactor vessel that is provided with a reactor core and its associated support systems and one or more satellite tanks that each include a pump for circulation of liquid metal and a heat exchanger. Each of the satellite tanks is connected to the reactor vessel by two conduits. These conduits are preferably arranged so that liquid metal may freely circulate between the reactor vessel and the satellite tanks. This arrangement provides for hydraulic interconnection of all vessels in the system thus providing a similar system behavior as in a pool vessel. Operation of the system with one pump out of service is thus made possible as well as means of accomodating a pump failure without the use of fast acting check valves. The advantage provided by this type of an apparatus is that a large amount of liquid metal is in direct contact with the reactor core so that if the core temperature rises, there is a substantial thermal inertia that resists a sharp or sudden rise in temperature. The upper and lower conduit means may be arranged to cause the hot liquid metal to flow from the reactor vessel to the satellite tank by convection to permit a flow of liquid metal to be established that will exert a cooling effect on the reactor core in the absence of a pumped or forced circulation of liquid metal.

Each satellite tank may be provided with an intermediate heat exchanger that is a part of a primary liquid metal loop. Alternatively, the heat exchanger may include means for the direct generation of steam and it may be connected to a secondary liquid metal heat exchanger for the purpose of steam generation by a secondary liquid metal loop.

It is contemplated that the satellite tank may be fabricated as a standardized module having a defined heat exchange capacity and/or steam generation capacity. One, two, three or more modules may be connected to a single reactor vessel that may also be substantially fabricated off site. It is envisioned that the reactor vessel size would remain uniform and for small power generation needs the available space within the core region utilized for storage of spent fuel. Thus for small power generation applications, a separate vessel for storage of spent fuel would not be required and for intermediate power generation applications the size requirements for this vessel would be reduced.

The satellite tank is preferably fabricated with a transverse support structure and baffle assembly that extends across the central portion of the tank. This support structure provides means that engage and provide lateral support for the pump and heat exchanger. Vertical support is provided by a transverse support structure at the top of a satellite vessel. Provision for flow of liquid metal through the satellite tank is provided by insertion of a pump into a conduit which connects the bottom of the satellite tank with the gaseous space at the top of the vessel.

The satellite tank is intended to have a lower plenum that is utilized to contain a supply of cold liquid metal. The lower plenum should be large enough to hold an amount of liquid metal that will impart a sufficient degree of thermal inertia to aid in the prevention of rapid temperature transients to either the pump or the reactor core if abnormal operating conditions are encountered. The reactor vessel will also have a lower plenum that will hold a quantity of liquid metal that still provides a degree of thermal inertia and mixing of flows from each satellite vessel.

The upper and lower conduit means will have a relatively short length which can be basically considered to be extension of the vessel nozzles, piping support and snubber requirements and the need for auxilliary systems and structures are eliminated. Suitable thermal expansion means such as sinusoidal bellows may be used in the conduit piping. The lower conduit means may be fitted with an internal coaxial pipe that connects the pump outlet with the inlet of the core plenum that is placed around the lower portion of the reactor core. The internal coaxial pipe carries cold liquid metal that passes from the pump to the core plenum. The liquid metal flows from the core plenum upwardly through the core where it is heated and rises to the upper part of the reactor vessel. The hot liquid metal passes through the upper liquid metal conduit to the heat exchanger in the satellite tank. This heat exchanger may be an intermediate heat exchanger similar to that which is used in a pool vessel or it may be a uniquely designed heat exchanger that takes advantage of the design flexibility of the satellite vessel approach.

The reactor vessel and satellite tank are provided with a unitary containment vessel that will contain any liquid metal leakage from the reactor vessel, satellite tank or the connecting conduits. The containment vessel extends completely around the satellite tanks and the reactor vessel and it may be provided with an exterior insulated cooling shroud that defines a space surrounding the reactor vessel and satellite tanks. The cooling shroud may be provided with cooling fins and a cooling medium such as air may be circulated between the containment vessel and the cooling shroud for a diverse and independent shutdown heat removal system.

Sodium is the preferred liquid metal but other liquid metals and fluids ma be utilized.

The present invention is illustrated, as best seen in FIG. 1, in an embodiment for which one reactor vessel 2 is shown with four satellite tanks 6. The reactor vessel 2 and satellite tanks 6 are each secured within an individual containment vessel 4. Upper and lower containment passages 9 and 11 are provided to house upper and lower liquid metal conduits 10 and 12 which are connected to the reactor vessel 2. Upper and lower liquid metal conduits 10 and 12 afford communication between the reactor vessel 2 and each satellite tank 6.

Figure 2:
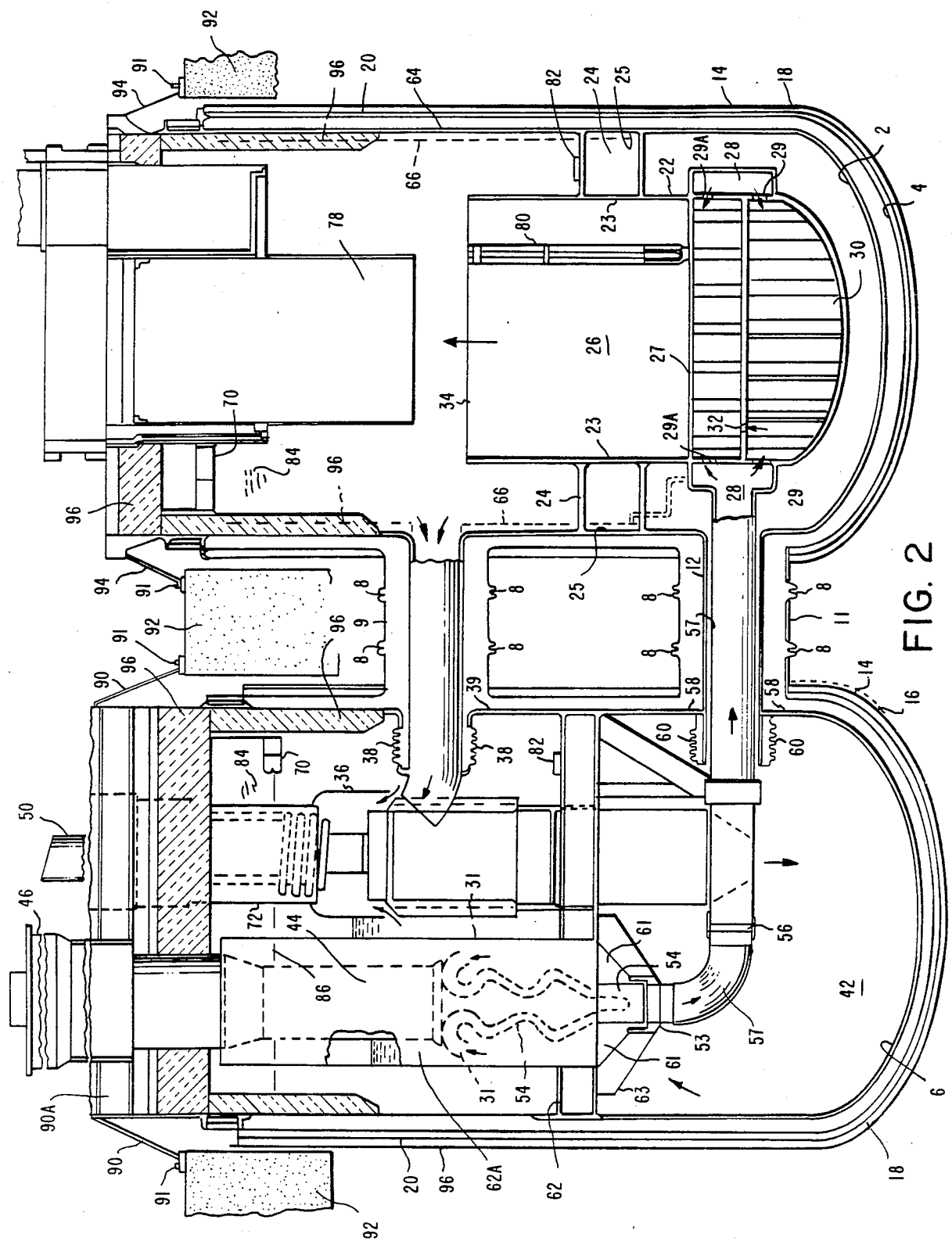
FIG. 2 is a diagrammatic sectional elevational view of a liquid metal reactor of the invention illustrating a single satellite tank.

The reactor vessel 2 is best seen in FIG. 2 and is comprised of a reactor core 22 supported in the reactor vessel 2 by a support bracket 24 that is affixed to the side wall 25 of the reactor vessel 2 and to the side wall 23 of the reactor core 22. A core inlet plenum 28 is affixed to the lower inlet structure of the reactor core 22. The core inlet plenum 28 communicates with a core support structure 30 through a plurality of openings 29. The core inlet plenum 28 is connected to the central portion 26 of the reactor core 22 at the lower end 27. Openings 32 and 29A allow liquid metal to flow upwardly through holes (not illustrated) into the housing 35 for the fuel support modules. A single fuel assembly 80 is shown in the reactor core. The upper area of the reactor vessel 2 and of the satellite tank 6 are provided with slosh baffles 70 that maintain a quiescent sodium/gas interface and prevent any liquid from contacting the insulated reactor vessel cover or the insulated satellite tank cover 74. Inert gas space above the baffles 70, may be filled with argon. Housing 78 contains conventional core control rods, and refueling apparatus, not illustrated.

The reactor vessel 2 may also further comprise an internal jacket 66 that is disposed on the upper side walls 64. Pipe inlet 68 is tapped off of reactor core plenum 28 to provide a flow of cool liquid sodium.

Figure 5:
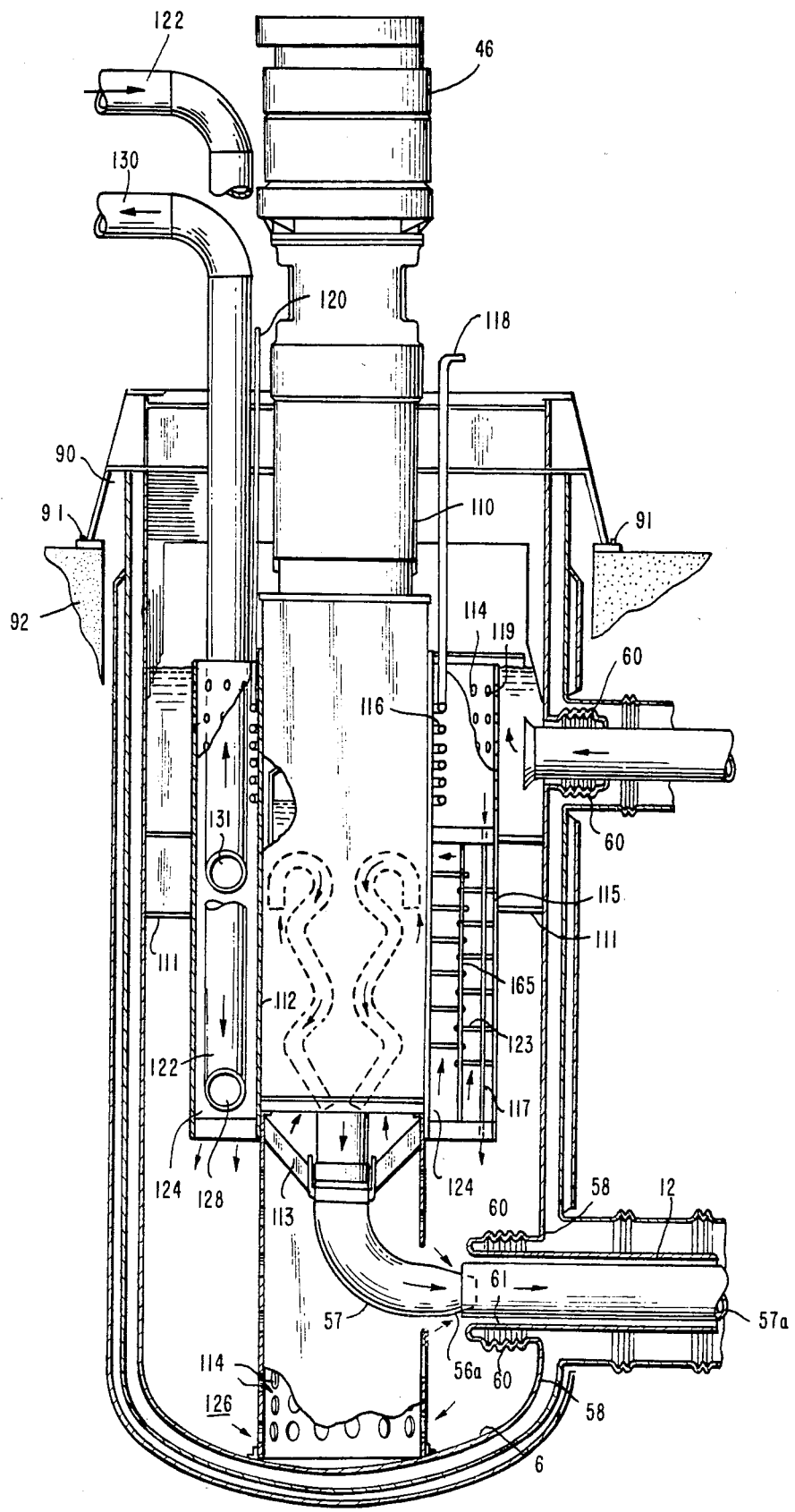
FIG. 5 is a diagrammatic sectional elevational view of a satellite tank of the liquid metal reactor of the invention with an alternate heat exchanger means.

The reactor vessel 2 is surrounded by containment vessel 4 which is sealed and is filled with an inert gas such as argon to act as a container to collect any liquid sodium that leaks from the reactor vessel 2. Alternate containment closure designs such as shown in FIG. 5 can be provided to enclose the inert gas space of the satellite or reactor vessels up to the reactor vessel suspension bracket 90. A cooling shroud 14 which bears a layer of insulating material 16 is placed around the containment vessel 4. Between the containment vessel 4 and cooling shroud exists a duct space 18 which may be utilized as a channel for circulation of air or any other coolant by any suitable moving means that are not illustrated. The containment vessel may be further extended above the suspension bracket to enclose as much of the inert gas space above the suspension bracket as desired.

A gas space is also provided between the insulation and the cavity wall surface to enable circulation of coolant to keep the operating temperature of the concrete at permissable levels. Alternatively, water cooling may be embedded beneath the concrete cavity surface for this purpose. The duct space 18 may serve as a housing for cooling fins 20 which are preferably mounted on the exterior wall of the containment vessel 4. The cooling fins are metal struts that are attached to the wall of the containment vessel to radiate heat. These cooling fins may serve as an alternate and independent means for decay heat removal by circulation of coolant past the fin surfaces. The system will also operate in the event a satellite vessel or the reactor vessel leaks liquid metal to the containment vessel. Alternate methods of operation of this system could include prefilling the containment vessel with liquid metal to further facilitate heat removal from the vessels. This mode of operation would also serve to limit the amount of liquid metal which could leak from the vessels.

Expansion joints 8 are provided in the containment passages 9 and 11 between the satellite tanks 6 and the reactor vessel 2.

A system satellite tank 6 is best seen in FIG. 2 and is further comprised of upper liquid metal conduit 10 and lower liquid metal conduit 12. Upper liquid metal conduit 10 is provided with expansion joints 38 that are integrally formed with the side wall 39 of satellite tank 6. The lower wall 58 of satellite tank 6 is provided with expansion joints 60. The upper liquid conduit 10 carries hot liquid sodium to the intermediate heat exchanger 36 where the heat is transferred to a secondary sodium loop 50. The heat exchanger 36 discharges cooled sodium into the lower plenum space 42. A second heat exchanger (not shown) is also present in the satellite tank. Each heat exchanger is supported by transverse support 90A. The lower plenum space 42 is configured to insure that a residual amount of liquid sodium is provided that will dampen thermal gradients encountered during abnormal operating conditions. A vertical housing 62A is provided to interconnect the lower plenum space 42 with the gaseous area 72 above the upper plenum. A vertical pump 44 is inserted in this housing, supported by the support structure 90A and it takes suction from plenum 42 with flow entering the pump suction via space 61. The intake of pump 44 is at intake port 31. Pump drive means 45, which comprise an electric motor, not illustrated, are located on the upper exterior outside surface of the satellite tank. Alternative pump means including electromagnetic fluid flow couplers may be used. The satellite tank 6 is provided with a transverse support structure 62 that supports pump housing 62A and provides lateral restraint to the housing and its pump, as well as lateral restraint to heat exchanger 36. The support structure also serves as a baffle to the stagnant liquid metal within it to separate the hot and cold pools.

Inspection and fabrication assembly access holes 82 are provided in both the satellite tank 6 and the reactor vessel 2 to allow for inspection of the various components of the reactors and for use during the fabrication phase. An inspection and manufacture hole (not shown) is also provided in the top of the satellite vessel.

Satellite suspension bracket 90 is used to support the weight of satellite tank 6 on concrete support 92 to which it is secured with bolts 91. Reactor vessel 2 is similarly supported on reactor vessel suspension bracket 94. Thermal insulation 96 is provided at the upper end of reactor vessel and satellite tank 6. Radiation shielding is provided in the upper portions of the vessels' support structure (above thermal insulation 96). Seismic forces are accomodated by having the reactor vessel support 94 rigidly attached to a concrete support 92 and satellite vessel supports 90 rigidly attached to the same concrete structure. The containment vessel is attached to the top of the reactor vessel and satellite vessels and moves with the vessels under a seismic disturbance. Expansion bellows 8 accomodate relative motion between the containment areas surrounding the reactor vessel and satellite vessels.

The pump flow circuit comprises intake port 31 and discharge passage 54. Slip joint 53 at the lower portion of the discharge passage 54 is connected to liquid metal duct 57 that is coaxially located inside lower liquid metal conduit 12. Liquid metal duct 57 is supported by support brackets 63 and is provided with slip joint 56 to permit thermal expansion. The liquid metal duct 57 is connected to the core inlet plenum 28.

In operation, the liquid sodium passes out through the reactor top 34 of reactor core 22 at a temperature of about 950° F. The liquid sodium then passes through the upper support structure 78, mixes in the upper plenum area of the reactor and exits to the satellite tank through the upper liquid metal conduit 10. Within the satellite vessel the liquid sodium mixes within the upper plenum area and enters the heat exchanger 36. In the heat exchanger 36 heat is transferred to a secondary sodium heat transfer loop 50 that is connected to the heat exchanger 36. The cooled liquid sodium exits the heat exchanger into satellite tank plenum 42 at a temperature of about 670° F. The cool sodium passes via channel 61 up to pump intake opening 31. The liquid sodium is taken into intake port 37 of pump 44 and discharged through discharge passage 54 into the liquid metal duct 57. The slip joint 56 is arranged so that any expansion of liquid metal duct 57 will not place any transverse stress on pump 44 or reactor core 22.

The liquid sodium flows into the core inlet plenum 20 and through the core support structure 30 and upward through openings 32 upwardly through holes 33 (not shown) into the housing 35 for the fuel support modules and passes fuel assemblies such as fuel assembly 80 where it is heated to a temperature of about 950° F. The hot sodium flows out of the top of reactor core 34.

The static level 84 of the liquid sodium in the reactor is reached only when the pump is not operating. The satellite tank operating level 86 is less than the reactor vessel operating level. This is due to the pressure losses in upper liquid conduit 10.

Figure 3:
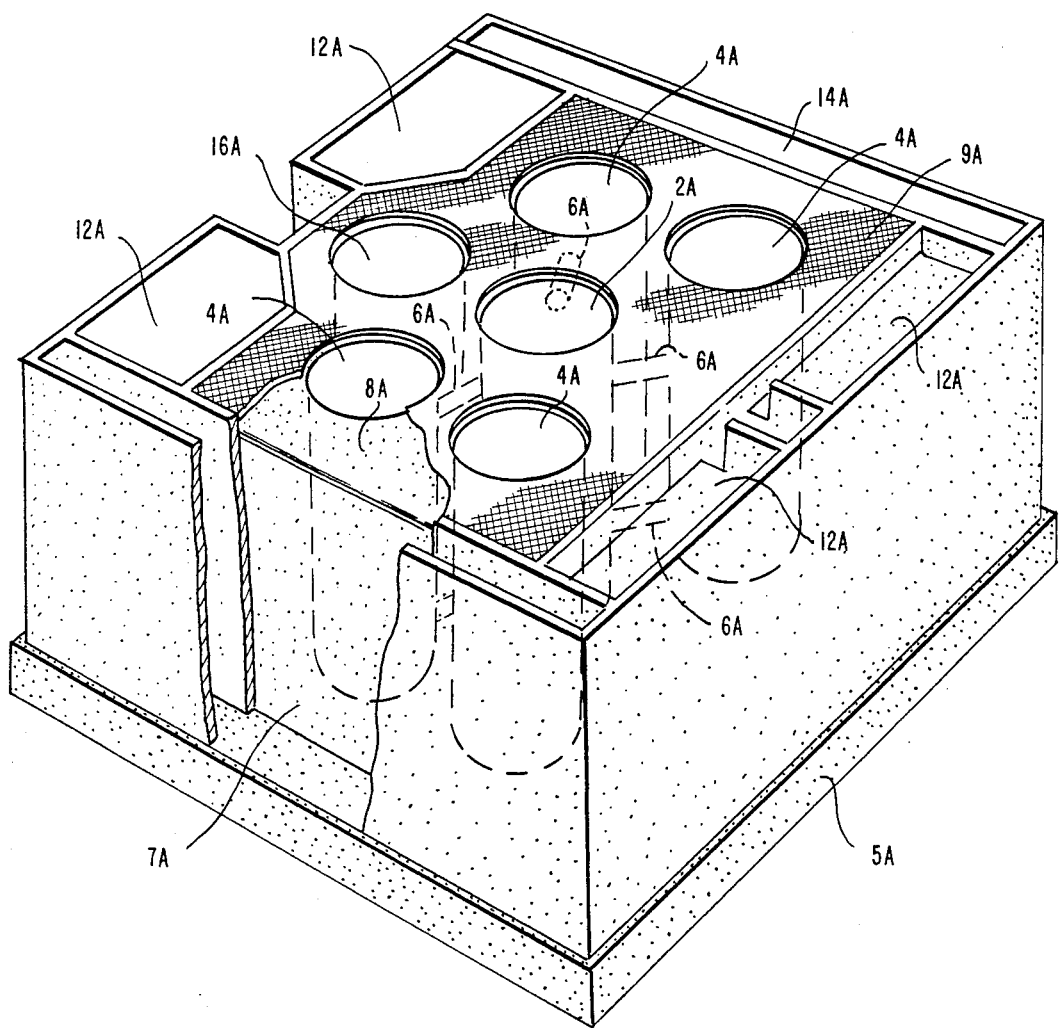
FIG. 3 is a top plan view of a liquid metal reactor seen in FIG. 1 of the invention which has four satellite tanks, associated steam generation compartments, and a storage vessel for spent fuel.

FIG. 3 shows a perspective view of the monolith support structure 7A for a liquid metal reactor of this invention which shows the relative locations of the cavities reactor for the vessel 2A, satellite tanks 4A and conduits 6A. The fuel storage vessel cavity 16A is in close proximity to reactor vessel cavity 2A to simplify the refueling process. Steam generation compartments 12A and auxilliary compartments 14A are located adjacent to the monolith to minimize piping and electrical requirements. Each of the vessels, including the fuel storage vessels are located with circular cavities of a large monolith concrete support structure. The supports of each vessel are attached to the top of the reinforced concrete monolith.

Figure 4:
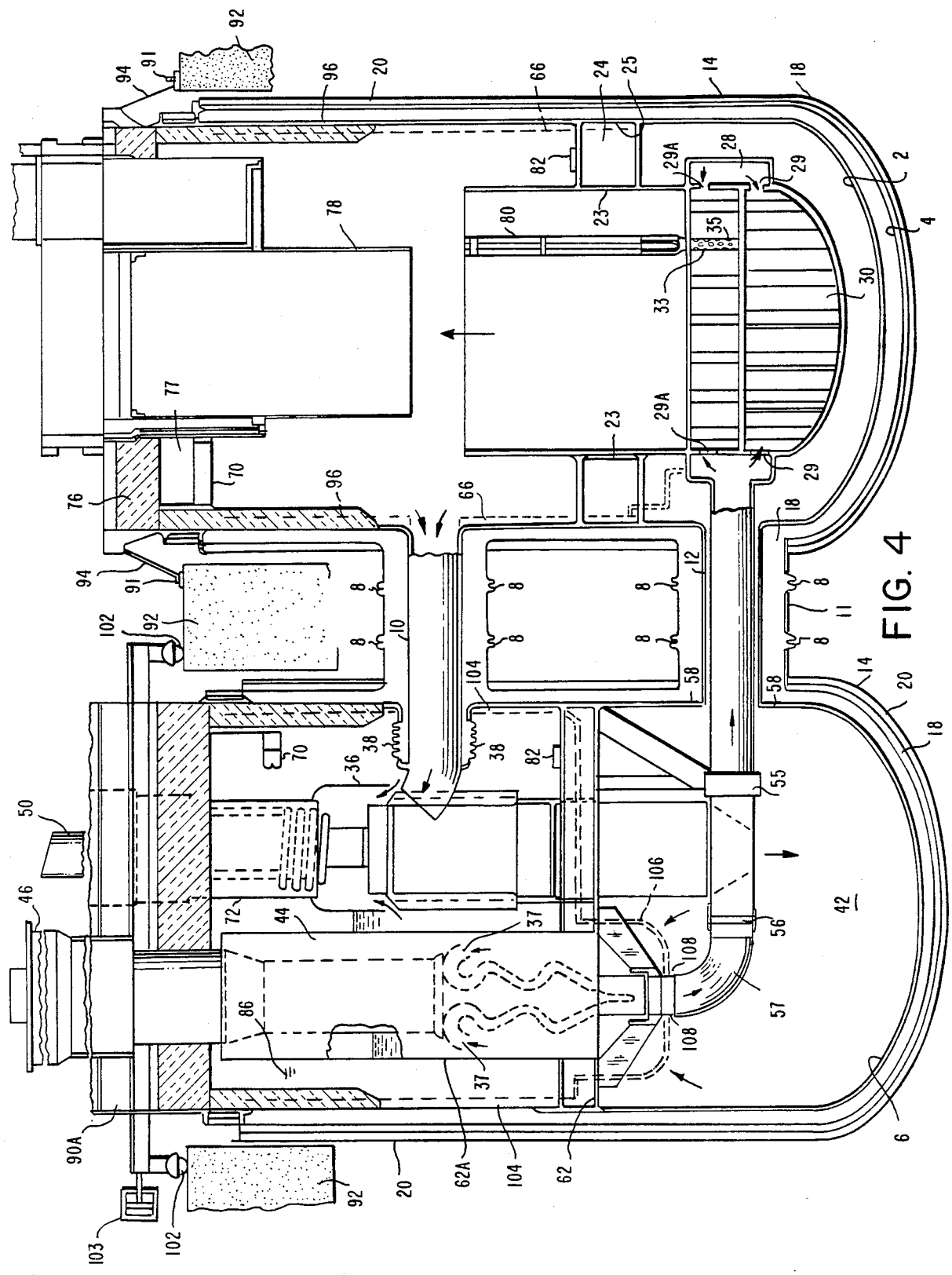
FIG. 4 is a diagrammatic sectional elevational view of a liquid metal reactor of the invention illustrating a single satellite tank with an alternate means of accomodating thermal expansion.

FIG. 4 illustrates a further emobodiment of the invention wherein satellite tank 6 is provided with an alternate means for thermal expansion. The lower wall 58 of satellite tank 6 does not have any provisions for expansion where it is joined by lower liquid metal conduit 12. Expansion means are provided by rollers 102 which support the satellite tank 6 and permit transverse motion caused by expansion of lower liquid metal conduit 12. The rollers are guided to move in a linear direction and seismic snubbers 103 are provided to limit the satellite vessel movements in the event of an earthquake. The reactor vessel is rigidly supported by means of support 94 to the concrete support structure 92. The upper part of satellite tank 6 may be provided with an internal cooling jacket 104 which provides cooling by the circulation of cool liquid sodium which is taken from the output of pump 44 through line 106 which is connected to liquid metal duct 57 at outlet 108.

FIG. 5 is a view of an embodiment of a satellite tank of the invention having a pump 110 that is coaxially located in the satellite tank 6 and supported principally by upper tranverse support 113. Support bracket 111 which primarily supports heat exchanger 115 may be placed at a level in the satellite tank 6 so that the vertical expansion of the satellite tank relative to the reactor vessel will not place undue stress on the horizontal conduits and pump discharge line 57. The pump housing 112 is covered on its upper exterior with a mixing baffle 114 that directs primary sodium into heat exchanger 115 that is provided with tubes 117, primary liquid sodium flows through the tubes 117, to plenum space 126. Secondary sodium enters from secondary sodium inlet duct 122 from an inlet (not shown) and is passed to the lower part 124 of the heat exchanger 115. The secondary sodium is directed around the periphery of the heat exchanger by a directing tube (not shown) which is connected to the end 128 of secondary sodium inlet duct 122. The secondary sodium outlet 130, is connected to a connecting tube (not shown) at inlet 131. The connecting tube extends partway around the periphery of the upper region of heat exchanger 115 to collect the hot secondary sodium that flows up past tube 117 which is representative of a plurality of tubes in the heat exchanger and heat exchanger baffles 123. Coils 116 are placed in the upper region of the satellite tank 6 and are connected to inlet conduit 118 and outlet conduit 120 to form a backup cooling system for use if the primary cooling system fails. Holes 119 may be of different dimensions or may have different spacing or may have a combination of different dimensions and spacing around the circumference of mixing baffle 114 to promote uniform flow of liquid metal to avoid any localized overheating.

The pump bracket 132 supports liquid metal duct 57. Flow nozzle 56a as shown in FIG. 5 provides an alternate means for connection in pump discharge line 57 that may be utilized in any of the embodiments of this invention. A gap between the flow nozzle 56a and the end of flow conduit 57a is provided to accomodate thermal expansion effects. The nozzle size and pump discharge pressure is such that a small induced flow directly from the bottom plenum of the satellite tank is possible under normal operating conditions. At shutdown when natural circulation of the primary coolant is desirable, the gap between the nozzle 56a and duct 57a will assure an unimpeded and direct flow path for natural convective flow to the core. Line 57a may be provided with a diffuser to minimize pressure losses, also spacers 61 may also be provided within the annular space of the coaxial ducts.

Figure 6:
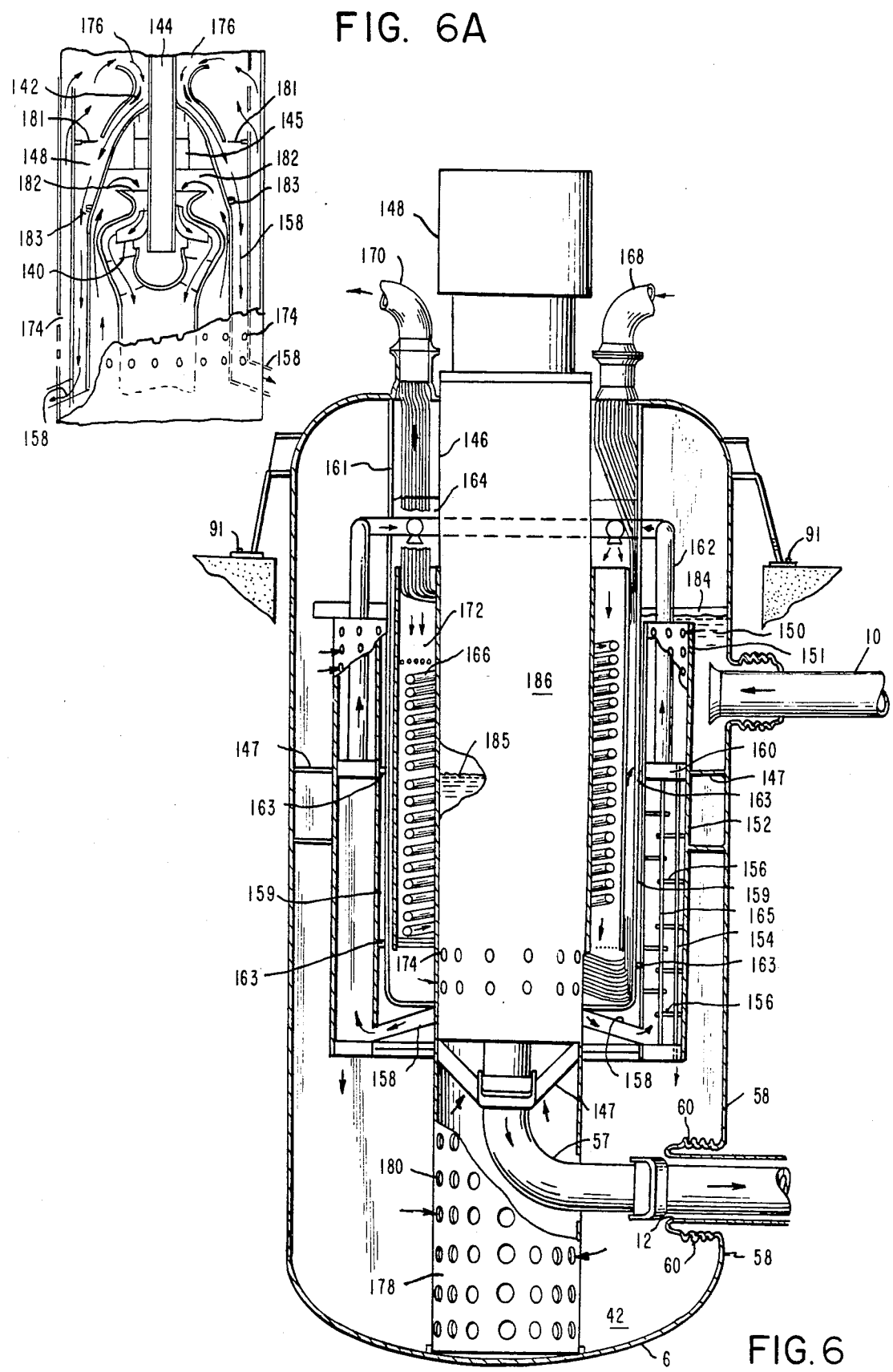
FIG. 6 is a diagrammatic sectional elevational view of a satellite tank of the liquid metal reactor of the invention with an alternate heat exchanger and pump means.

FIG. 6 illustrates a sectional elevation of a combined primary and secondary system satellite tank that includes a helical coil steam generation system. The containment vessel upper transverse support structure and insulation is now shown in the view for clarity.

Central downcomer 146 acts as a support and housing for the pump 148. Support bracket 147 also provides support and stability. An annular mixing plenum 150 is provided above the upper end of heat exchanger 152. Hot liquid primary sodium is passed from upper liquid conduit 10 through holes 151 in the annular mixing plenum and then downward through vertical tubes 154 which run through annular heat exchanger 152. Heat exchanger 152 which may be welded in place or detachably affixed with suitable fasteners, is provided with baffles 156 and associated to rod 165 that insure slow upward passage of secondary sodium that is received from secondary sodium inlet duct 158. Hot secondary sodium is taken from the heat exchanger at header 160 into line 162 which directs the flow to the entrance mixing area 164 of the steam generator 161 which is provided with steam generator coils 166. The steam generator coils 166 are connected to water inlet 168 and steam outlet 170. They are formed into a helix which is partially shown. Secondary liquid sodium flows down around the steam generator coils 166 through annular heat exchanger chamber 172. At the lower end 171 of annular heat exchanger chamber 172, pump intake ports 174 direct the cool secondary liquid sodium to the pump chamber.

FIG. 6A is a partial cutaway view of the pump chamber of the pump 148. The primary pump rotor 140 and secondary pump rotor 142 are mounted on common pump shaft 144. The pump intake ports 174 direct the liquid metal to the intake channel 176 which directs the liquid sodium to secondary pump rotor 142. The output is pushed through sodium inlet duct 158 to heat exchanger 152 which is shown in FIG. 6. Cool primary liquid sodium is passed through holes 180, shown in FIG. 6, to intake channels 182. The cool liquid sodium is passed from intake channels 182 to primary pump rotor 140 which pushes liquid sodium to the reactor core plenum, (not shown) through duct 57. Pump bearing 145 is lubricated by a feed of liquid sodium that is supplied by a tube (not shown) that is tapped off of the pump discharge circuit. Upper connecting joints 181 and lower connecting joints 183 are provided to facilitate removal of the pump internals.

A perforated shield 178 that may have differently sized or differently spaced holes 180 is provided to promote uniform mixing of cool sodium in lower plenum space 42. The lower plenum space 42 is hydraulically connected with the reactor vessel (not shown) and other satellite vessels (not shown) through lower liquid metal conduit 12

Annular space 159 serves the function of providing a conduit for the lower plenum to communicate with the upper gaseous space. Spacers 163 are provided for lateral stabilization of the steam generator under seismic conditions.

The normal operating level of liquid sodium 184 in the satellite tank 6 is at the upper level of the steam coils 166. The level of liquid sodium 185 in the pump chamber 186 is above the level of pump rotor 142 shown in FIG. 6A.

During operation, the primary pump discharge is at a higher pressure than the secondary circuit pump discharge and a continuous linkage of primary flow enters the secondary pump via the leakage past the pump bearing. The primary coolant volume is maintained by an auxilliary make up and clean up system (not shown) which is housed outside the satellite tank. This system (not shown) removes a flow equal to or greater than the pump bearing leakage flow, purifies the secondary sodium, and returns sodium to the primary system to maintain its inventory as well as any excess flow back to the secondary system circuit. In the event a steam generator tube leak occurred, the secondary system could be pressurized as a result of sodiumwater reactions. A rupture disk at the top of the satellite vessel would serve to vent the pressure to a blow off system (not shown) thus maintaining the pressure integrity of the secondary sodium system circuit. Alternative pump means such as electromagnetic pumps or electromagnetic fluid flow couplers which do not require pump bearing seal leakages can be utilized for this concept.

Alternatively, these steam outlet nozzles may be located at the bottom of the vessel by routing the tubing discharge from the top of the helical bundle down past the exterior of heat exchanger 214.

Figure 7:
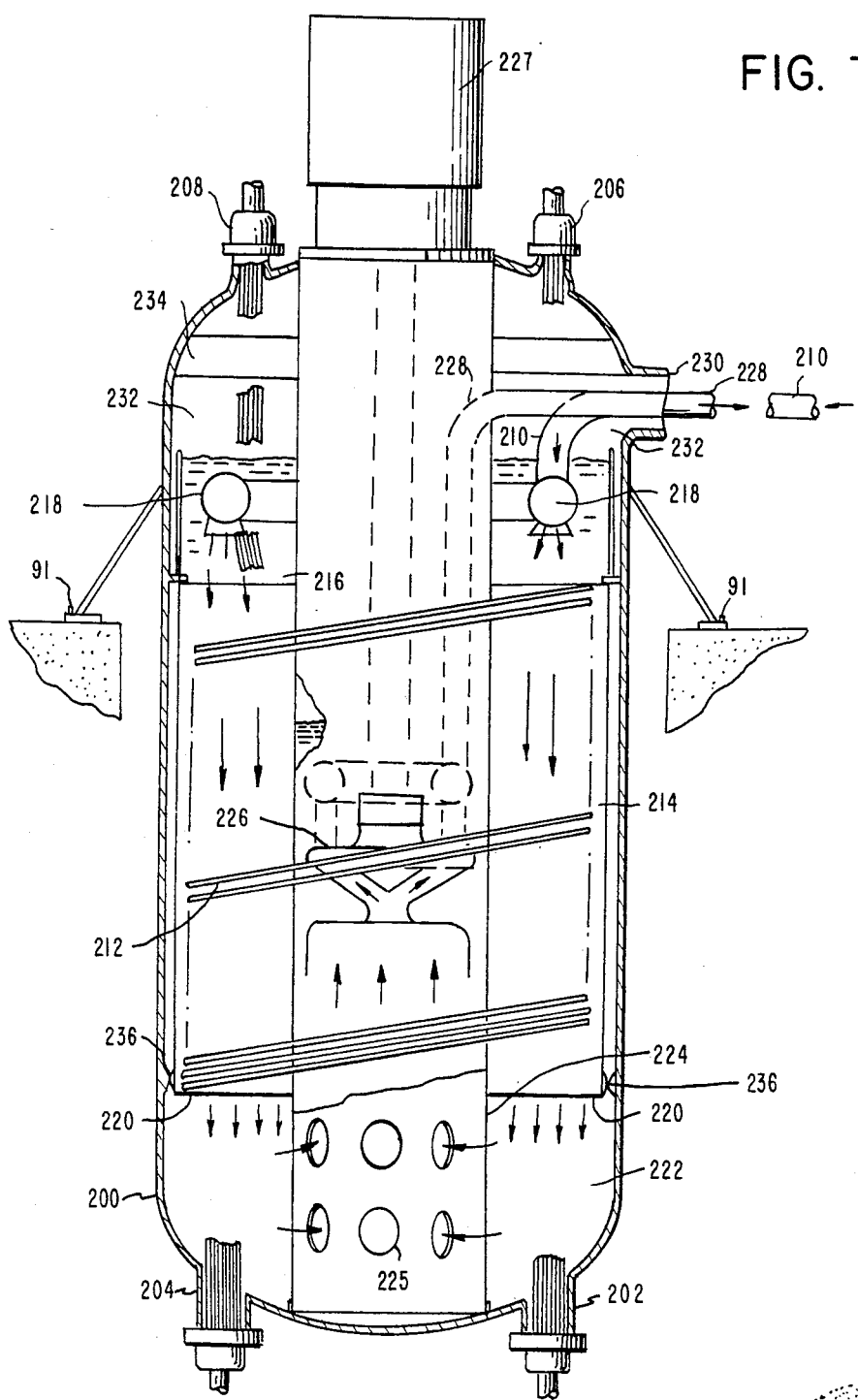
FIG. 7 is a diagrammatic sectional elevational view of a steam generation vessel for use with the liquid metal reactor.

FIG. 7 is a diagrammatic sectional elevation of a steam generator for use in a secondary sodium loop according to the invention. The generator comprises a tank 200, that has water inlets 202 and 204 and steam outlets 206 and 208. The intake pipe 210 is connected to a nozzle (not shown) as a part of a secondary liquid sodium loop that transfers heat from a primary sodium loop to the steam generator 200. Water inlets 202 and 204 are connected to a plurality of tubes that are formed into a helical coil that is configured as an annular heat exchanger 214. The tubing exits the helical coil and is directed to manifolds at the steams outlet nozzles 206 and 208. The annular heat exchanger 214 is provided at the upper end 216 with a manifold 218 that allows hot sodium to enter the annular heat steam generator. The lower plenum has a central downcomer 224 that is perforated with holes 225 that permit cool sodium to flow inwardly and upwardly to pump 226 which is operated by motor 227. The output pipe 228 of the pump 226 acts as a conduit to bring cool liquid sodium to outlet nozzle 230.

Inert gas space 232 is filled with a suitable inert gas such as argon. Bracket 234 stabilizes the pump housing 235 and bumpers 236 provide lateral support while accomodating thermal expansion and seismic forces.

Nozzle 230 sidewalls are envisioned to be extended coaxially around piping 228 and 210 up to the entrance and exit nozzles for this piping at the top of the satellite tank, using suitable thermal expansion means such as bellows. Appropriate insulation (not shown) may be used on the upper interior walls of the steam generator.

Any alternate steam generator may be utilized with the novel reactor of the invention such as the steam generator disclosed in ASME paper 80-C2/NE-29 which is incorporated by reference.

Figure 8:
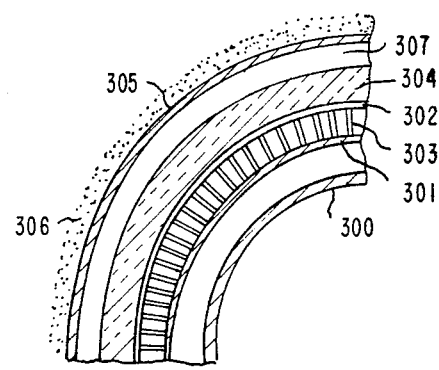
FIG. 8 is a cross-section of a portion of the external walls of the reactor vessel or the satellite tanks.

FIG. 8 is a partial cross-section of the outer walls of the reactor tank or satellite tanks of the invention. Vessel wall 300 is the interior wall of either the reactor vessel or the satellite tank. The containment vessel 301 surrounds the vessel wall and on its exterior surface has a plurality of cooling fins 303 that are provided between containment vessel 301 and shroud 302. An insulating layer 304 is placed on the exterior of shroud 32 between the cavity wall of the liner 305, for concrete wall 306, to define an annular space 307 between insulating layer 304 and liner 305.

The liquid metal reactor of the invention may be fabricated in dimensions that are selected according to the desired output. Generally reactor vessel and satellite tanks may be from about 5-15 meters. In diameter and from about 15-23 meters in height. The upper and lower liquid metal conduits may be about 50 cm-130 cm in diameter and the containment vessel may be spaced approximately 20-35 cm from the satellite tanks and reactor vessel. The cooling fins may be 0.1 cm-5 cm thick and may extend from the wall of the containment vessel for 2 cm-20 cm to the shroud. The reactor vessel and the satellite tanks may be spaced from 1 to 10 meters apart.

While the invention has been disclosed with respect to the particular drawings and embodiments shown and described, the invention is not to be limited thereby but is only to be limited by the scope of the appended claims.

I claim:

1. A liquid reactor comprising:
   (a) a reactor vessel having a core;
   (b) one or more satellite tanks;
   (c) pump means in said satellite tank;
   (d) heat exchanger means in said satellite tank;
   (e) an upper liquid metal conduit extending between said reactor vessel and said satellite tank;
   (f) a lower liquid metal duct extending between said reactor vessel and satellite tanks said upper liquid metal conduit and said lower liquid metal duct being arranged to permit free circulation of liquid metal between said reactor vessel core and said satellite tank by convective flow of liquid metal;
   (g) a separate sealed common containment vessel around the reactor vessel, conduits and satellite tanks;
   (h) said satellite tank having space for a volume of liquid metal that is sufficient to dampen temperature transients resulting from abnormal operating conditions.

2. A liquid metal reactor as defined in claim 1 further comprising a lower plenum in each of the satellite tanks that is hydraulically interconnected through a lower liquid metal conduit to a plenum in said reactor vessel.

3. A liquid metal reactor as defined in claim 2 further comprising a conduit which interconnects the volume of liquid metal that is in the lower plenum of the satellite tank with a gaseous space that is provided above the volume of liquid metal in said satellite tank.

4. A liquid metal reactor as defined in claim 2 further comprising pump means housed within the conduit connecting the lower plenum and the gaseous space.

5. A liquid metal reactor as defined in claim 2 further comprising means for accomodating thermal expansion of the vessels and liquid metal conduit which comprise roller means that permit horizontal movement of the satellite tank, an expansion means in the pump discharge conduit, and expansion means in the portion of the separate sealed common containment vessel that surrounds said upper liquid metal conduit and said lower liquid metal conduit.

6. A liquid metal reactor as defined in claim 5 which further comprises means to resist seismic forces said means comprising attachment means for rigidly fastening the reactor vessel to a support and seismic snubbers for attachment to the exterior of said satellite tanks.

7. A liquid metal reactor as defined in claim 2 further comprising means for accomodating thermal expansion of the vessel and conduits which comprise expansion means in the upper and lower liquid metal conduits, and a pump discharge conduit; and expansion means in the portion of the separate sealed common containment vessel that surrounds said upper liquid metal conduit and said lower liquid metal conduit.

8. A liquid metal reactor as defined in claim 7 which further comprises means to resist seismic forces which comprise attachment means for rigidly fastening the reactor vessel and satellite tank to a support.

9. A liquid metal reactor as defined in claim 2 which further comprises a plurality of cooling fins mounted on the exterior of said containment vessel.

10. A liquid metal reactor as defined by claim 1 wherein the liquid metal is selected from the group consisting of sodium and a mixture of sodium and potassium.

11. A liquid metal reactor as defined in claim 2 which further comprises a flow nozzle in a pump discharge line that is connected to said pump means.

12. A liquid metal reactor comprising:
   (a) a reactor vessel having a core;
   (b) one or more satellite tanks;
   (c) an upper plenum located in the satelitte tank for receiving hot liquid metal;
   (d) a lower plenum located in the satellite tank for receiving cooled liquid metal, which is hydraulically interconnected with each satellite tank and the reactor vessel by a lower liquid metal conduit;
   (e) pump means in said satellite tank;
   (f) heat exhcanger means in said satellite tank;
   (g) an upper liquid metal conduit extending between said reactor vessel and said satellite tank;
   (h) a lower liquid metal duct extending between said reactor vessel and said satellite tank which with said upper liquid metal conduit hydraulically interconnects each satellite tank and the reactor vessel; said upper liquid metal conduit and said lower liquid metal duct being arrnaged to permit a free circulation of liquid metal between said reactor vessel and said satellite tank by convective flow;
   (i) said satellite tank having space for a volume of liquid metal that is sufficient to dampen temperature transients resulting from abnormal operating conditions and a gaseous space above the volume of liquid metal;
   (j) a separate sealed common containment vessel around the reactor vessel, conduits and satellite tanks; and
   (k) a conduit which interconnects the lower plenum of each satellite tank with the gaseous space above the upper plenum in each satellite tank.

13. A liquid metal reactor as defined in claim 12 further comprising a transverse structure across the central portion of said satellite tank to give lateral support to said pump means and said heat exchanger, said traverse structure also acting to separate the upper and lower plenum areas.

14. A liquid metal reactor as defined by claim 13 further comprising a lower plenum at the bottom of said satellite tanks and said reactor vessel, said lower plenum being sized to hold a reservoir of liquid metal.

15. A liquid metal reactor as defined by claim 14 further comprising a duct within the lower liquid duct and a plenum attached to the reactor core structure, said duct being connected to the pump means and to the plenum attached to the reactor core structure.

* * * * *